(12) United States Patent
Kwak et al.

(10) Patent No.: US 12,468,927 B2
(45) Date of Patent: Nov. 11, 2025

(54) EXPANDABLE NEUROMORPHIC CIRCUIT

(71) Applicant: KOREA INSTITUTE OF SCIENCE AND TECHNOLOGY, Seoul (KR)

(72) Inventors: Joon Young Kwak, Seoul (KR); Suyoun Lee, Seoul (KR); Inho Kim, Seoul (KR); Jong-Keuk Park, Seoul (KR); Kyeong Seok Lee, Seoul (KR); Jaewook Kim, Seoul (KR); Jongkil Park, Seoul (KR); YeonJoo Jeong, Seoul (KR); Gyuweon Hwang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1015 days.

(21) Appl. No.: 17/205,620

(22) Filed: Mar. 18, 2021

(65) Prior Publication Data

US 2022/0138546 A1     May 5, 2022

(30) Foreign Application Priority Data

Oct. 29, 2020   (KR) ........................ 10-2020-0142592

(51) Int. Cl.
*G06N 3/049* (2023.01)
*G06N 3/04* (2023.01)
(Continued)

(52) U.S. Cl.
CPC ............. *G06N 3/065* (2023.01); *G06N 3/049* (2013.01); *G11C 11/54* (2013.01)

(58) Field of Classification Search
CPC ........ G06N 3/065; G06N 3/049; G06N 3/063; G11C 11/54; G11C 11/1653; G11C 11/2253; G11C 13/0023
See application file for complete search history.

(56) References Cited

U.S. PATENT DOCUMENTS 5,293,457 A    3/1994  Arima et al.
2009/0313195 A1*  12/2009  Mcdaid ................. G06N 3/049
                                                    706/26
(Continued)

FOREIGN PATENT DOCUMENTS

CN   109255435 A   1/2019
CN   109754065 A   5/2019
(Continued)

OTHER PUBLICATIONS

"Application and Implementation of Neural Networks": Reading Show, Synapse Transistor Switch, Jun. 30, 1983.
(Continued)

*Primary Examiner* — Brandon S Cole
(74) *Attorney, Agent, or Firm* — Rabin & Berdo, P.C.

(57) ABSTRACT

A neuromorphic circuit according to example embodiments of inventive concepts includes a first neuron array including a plurality of neuron circuits generating a spike signal; a first synapse array including a plurality of first synapse circuits to process and output the spike signal transmitted from the first neuron array; a second synapse array including a plurality of second synapse circuits; a first connecting block positioned between the first synapse array and the second synapse array and connecting the first synapse array and the second synapse array in response to a control signal; and a control logic to generate the control signal. The neuromorphic circuit may easily expand the size of the synapse element array to a desired size by using a connecting block.

14 Claims, 7 Drawing Sheets

(51) Int. Cl.
  *G06N 3/048* (2023.01)
  *G06N 3/065* (2023.01)
  *G11C 11/54* (2006.01)

(56) References Cited

U.S. PATENT DOCUMENTS

| | | | |
|---|---|---|---|
| 2013/0073497 A1* | 3/2013 | Akopyan | G06N 3/063 706/27 |
| 2014/0114893 A1* | 4/2014 | Arthur | G06N 3/063 706/25 |
| 2018/0300612 A1 | 10/2018 | Lee | |
| 2019/0236441 A1* | 8/2019 | Shifren | G06N 3/049 |
| 2020/0293880 A1* | 9/2020 | Cohen | H10N 70/8828 |
| 2022/0138546 A1* | 5/2022 | Kwak | G11C 11/2253 706/33 |

FOREIGN PATENT DOCUMENTS

| | | |
|---|---|---|
| KR | 1020200024419 A | 3/2020 |
| KR | 1020200026586 A | 3/2020 |

OTHER PUBLICATIONS

Transmisstion gate composed of NMOS and PMOS transistors, https://m.elecfans.com/article/956478.html, Jun. 22, 2019 (machine translation is also provided).

\* cited by examiner

EXPANDABLE NEUROMORPHIC CIRCUIT

CROSS-REFERENCE TO RELATED APPLICATIONS

This US non-provisional patent application claims priority under 35 USC § 119 to Korean Patent Application No. 10-2020-0142592, filed on Oct. 29, 2020, the entirety of which is hereby incorporated by reference.

BACKGROUND

The present invention relates to a semiconductor device, and more particularly, to an expandable neuromorphic circuit.

As the computing paradigm shifts from a CPU-centric system to a data-centric system, a new computing architecture is required to overcome the performance limitations of the current Von Neumann Architecture. In particular, bio-inspired neuromorphic computing is one of the alternative approaches to the Von Neumann Architecture. Many new devices have high potential in terms of power consumption, scalability, and computational speed compared to CMOS-based neurons and synapses. For this reason, new devices for artificial neuron and synapses as the basic building blocks of the cranial nerve system are being studied extensively.

The ideal analog behavior of artificial synapses is one of the important factors for high learning accuracy of the nervous system based on artificial neural network algorithm. An ideal analog synapse device should have a linear and symmetrical synapse conductance update and a large on/off ratio by repetitive electrical spikes. For this reason, there are many difficulties in forming a synapse device that meets the required conditions. In addition, there are many difficulties in configuring a synapse device array or a neuron device array having an appropriate size capable of processing a required function.

SUMMARY

Embodiments of inventive concepts relate to a neuromorphic circuit that can easily expand the size of the synapse element array to a desired size by using a connecting block.

A neuromorphic circuit according to example embodiments of inventive concepts includes a first neuron array including a plurality of neuron circuits generating a spike signal; a first synapse array including a plurality of first synapse circuits to process and output the spike signal transmitted from the first neuron array; a second synapse array including a plurality of second synapse circuits; a first connecting block positioned between the first synapse array and the second synapse array and connecting the first synapse array and the second synapse array in response to a control signal; and a control logic to generate the control signal.

In example embodiments, the first connecting block includes a plurality of switches for transmitting signals of input lines or output lines of the first synapse circuits without changing a signal level in response to the control signal. Each of the plurality of switches includes a complementary pass transistor logic.

In example embodiments, the neuromorphic circuit further comprises, a third synapse array formed in a second direction perpendicular to the first synapse array; and a second connecting block connecting the first synapse array and the third synapse array. The second synapse array is formed in a first direction with respect to the first synapse array. The neuromorphic circuit further comprises a second neuron array formed between the first synapse array and the second connecting block.

Example embodiments of inventive concepts provide a neuromorphic circuit comprising a first neuron array arranged in a column direction and including a plurality of first neuron circuits generating first spike signals; a first synapse array including a plurality of first synapse circuits processing and outputting the first spike signals transmitted from the first neuron array; a second synapse array positioned in a row direction of the first synapse array and including a plurality of second synapse circuits receiving the first spike signals; a second neuron array arranged in the column direction and including a plurality of second neuron circuits generating second spike signals; a third synapse array including a plurality of third synapse circuits processing and outputting the second spike signals transmitted from the second neuron array; a fourth synapse array positioned in the row direction of the third synapse array and including a plurality of fourth synapse circuits receiving the second spike signals; a first connecting block positioned between the first synapse array and the third synapse array and connecting the first synapse array and the third synapse array in response to a control signal; a second connecting block positioned between the first synapse array and the second synapse array and connecting the first synapse array and the second synapse array in response to the control signal; a third connecting block positioned between the second synapse array and the fourth synapse array and connecting the second synapse array and the fourth synapse array in response to the control signal; a fourth connecting block positioned between the third synapse array and the fourth synapse array and connecting the third synapse array and the fourth synapse array in response to the control signal; and a control logic to generate the control signal.

In example embodiments, the neuromorphic circuit further comprises a third neuron array connected to output lines of the third synapse array and generating a first output spike signal, and a fourth neuron array connected to the output lines of the fourth synapse array and generating a second output spike signal.

In example embodiments, the first connecting block comprises a plurality of first switches for transmitting output signals of the first synapse circuits to the third synapse circuit without level change in response to the control signal. the second connecting block comprises a plurality of second switches for transmitting the first spike signals transmitted from the first neuron array to the second synapse circuit without changing a level in response to the control signal. the third connecting block comprises a plurality of third switches for transmitting output signals of the second synapse circuits to the fourth synapse circuit without changing a level in response to the control signal. the fourth connecting block comprises a plurality of fourth switches for transmitting the second spike signals transmitted from the second neuron array to the fourth synapse circuit without changing a level in response to the control signal.

In example embodiments, the neuromorphic circuit further comprises a third neuron array positioned between the first synapse array and the first connecting block; and a fourth neuron array positioned between the second synapse array and the third connecting block. The neuromorphic circuit further comprises a fifth neuron array connected to output lines of the third synapse array and generating first output spike signals; and a sixth neuron array connected to the output lines of the fourth synapse array and generating second output spike signals.

In example embodiments, each of the first to fourth connecting blocks includes a complementary pass transistor logic.

Example embodiments of inventive concepts provide a neuromorphic circuit comprising a first synapse array including a plurality of first synapse circuits for processing and outputting input spike signals; a second synapse array including a plurality of second synapse circuits; and a connecting block positioned between the first synapse array and the second synapse array and connecting the first synapse array and the second synapse array in response to a control signal.

In example embodiments, the connecting block comprises a plurality of switches for transmitting the input spike signals to the second synapse array without changing the level of the input spike signals in response to the control signal.

In example embodiments, the connecting block comprises a plurality of switches for transmitting signals of output lines of the first synapse array to the second synapse array without changing a level in response to the control signal.

In example embodiments, the connecting block comprises a complementary pass transistor logic.

In example embodiments, the control signal is provided based on a pruning or dropout operation.

BRIEF DESCRIPTION OF THE DRAWINGS

The forgoing and other features of inventive concepts will be described below in more detail with reference to the accompanying drawings of non-limiting embodiments of inventive concepts in which like reference characters refer to like parts throughout the different views. The drawings are not necessarily to scale, emphasis instead being placed upon illustrating principles of inventive concepts. The drawings are as follows.

DETAILED DESCRIPTION

Figure 1:
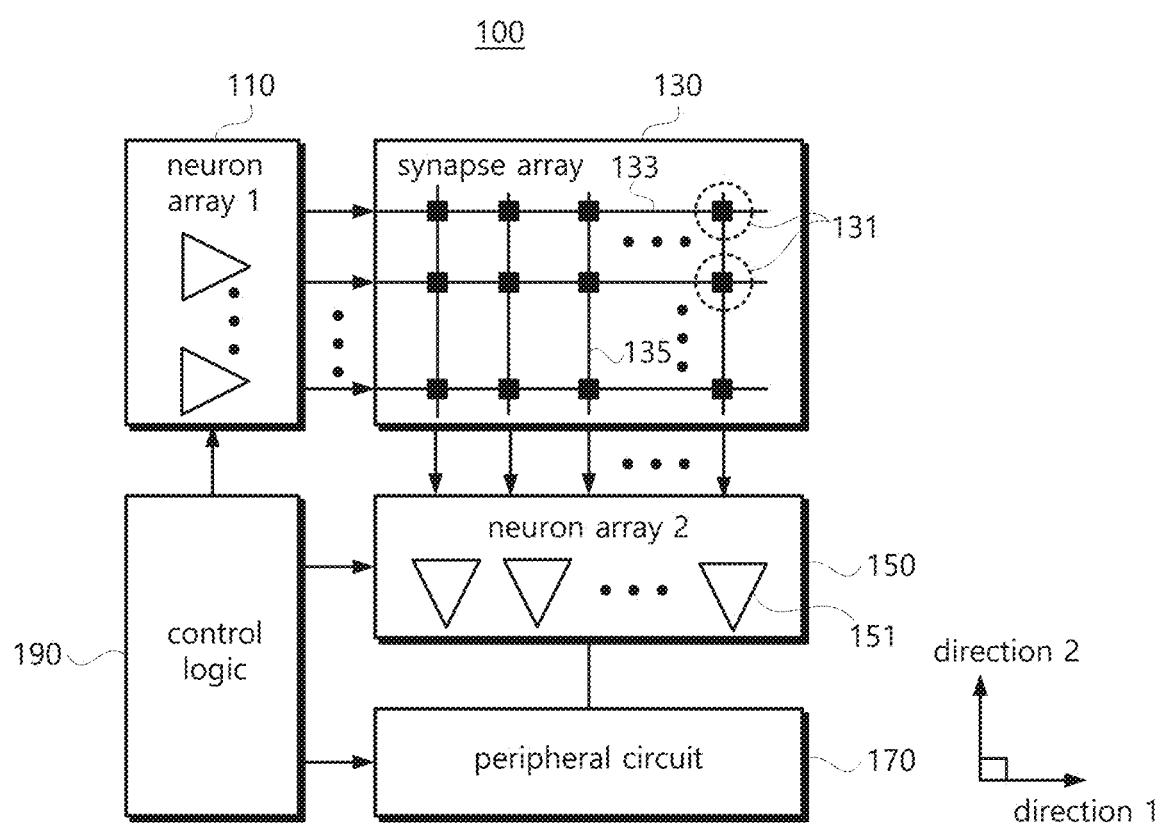
FIG. 1 is a block diagram illustrating a neuromorphic circuit according to an embodiment of the present invention.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like the first, second, A, B, (a), and (b). These are solely for the purpose of differentiating one component from the other but not to imply or suggest the substances, order or sequence of the components. If a component were described as 'connected', 'coupled', or 'linked' to another component, it may mean the components are not only directly 'connected', 'coupled', or 'linked' but also are indirectly 'connected', 'coupled', or 'linked' via a third component.

FIG. 1 is a block diagram illustrating a neuromorphic circuit according to an embodiment of the present invention. The neuromorphic circuit 100 may include a first neuron array 110, a synapse array 130, a second neuron array 150, a peripheral circuit 170, and a control logic 190.

The first neuron array 110 generates a spike signal and transmits it to the synapse array 130. The first neuron array 110 may include axons that generate input spike signals. Axons can perform the function of outputting signals to other neurons, similar to the axons of biological neural networks. For example, each of the axons of the first neuron array 110 may generate an input spike signal based on data or information input from the outside. The input spike signal may be a pulse signal that toggles for a short period of time.

The synapse array 130 may connect the first neuron array 110 and the second neuron array 150. The synapse array 130 may include synapse circuits 131 that determine whether the axons of the first neuron array 110 and neurons of the second neuron array 150 are connected and the connection strength. The synapse circuits 131 may process a spike signal input through the row line 133 and output a processing result through the column line 135. Devices for configuring the synapse circuits 131 may be devices such as flash memory, RRAM, PRAM, FRAM, and MRAM.

Each of the synapse circuits 131 may have a unique weight. Each of the synapse circuits 131 may receive an input spike signal and apply a weight to the input spike signal. The weight may be a numerical value indicating the correlation between the above-described axon and neurons, the strength of the connection between the axon of the first neuron array 110 and the neurons of the second neuron array 150, and the correlation of the second neuron array 150 with respect to the input spike signal or the like. Each of the synapse circuits 131 may output a weight to the second neuron array 150 according to the input spike signal. Each of the synapse circuits 131 may generate an operation signal based on an input spike signal and a weight and output the operation signal to the second neuron array 150.

Referring to FIG. 1, synapse circuits 131 are shown to be disposed on a two-dimensional array in a first direction and a second direction. The input spike signals may be transmitted in a first direction from the first neuron array 110 toward the synapse array 130. An operation signal (ie, an operation result) to which a weight is applied to the input spike signal may be transmitted in a second direction from the synapse array 130 to the second neuron array 150. For example, the first direction and the second direction may be perpendicular to each other. However, unlike the illustration of FIG. 1, it will be well understood that the synapse circuits 131 may be disposed on a 3D array.

The neuron circuits 151 of the second neuron array 150 may receive operation signals to which weights are applied to input spike signals from the synapse array 130, respectively. Each of the neuron circuits 151 may perform a function of receiving a signal output from another neuron, similar to the dendrites of a biological neural network. Referring to FIG. 1, each of the neuron circuits 151 may be connected to the synapse circuits 131 and may receive operation signals output from the synapse circuits 131.

In each of the neuron circuits 151, operation signals of the synapse circuits 131 disposed along the second direction may be accumulated. However, the number and arrangement of the synapse circuits 131 connected to each of the neuron circuits 151 are not limited to those shown in FIG. 1. Each of the neuron circuits 151 may compare the sum signal in which the operation signals of the synapse circuits 131 are accumulated with a threshold signal (ie, a reference signal), and generate an output spike signal when the sum signal is greater than the threshold signal (namely, neurons fire). The output spike signals of the second neuron array 150 may be provided back to the first neuron array 110, output to the outside of the neuromorphic circuit 100, or output to other components of the neuromorphic circuit 100.

The peripheral circuit 170 may control all analog operations of the neuromorphic circuit 100. In particular, the peripheral circuit 170 may provide and control operating conditions of the first and second neuron arrays 110 and 150 and the synapse array 130.

The control logic 190 may control an operation sequence of the neuromorphic circuit 100. The control logic 190 may control the transmission, processing, or update of spike signals of the first and second neuron arrays 110 and 150 and the synapse array 130.

In the above, the basic configuration of the neuromorphic circuit 100 of the present invention has been briefly described. In configuring the neuromorphic circuit 100 in hardware, a synapse array 130 having a relatively large size may be required. Alternatively, an increase in the number of hidden layers or a pruning or dropout operation may be required. In order to provide these characteristics, a method of expanding the synapse array 130 is required.

Figure 2:
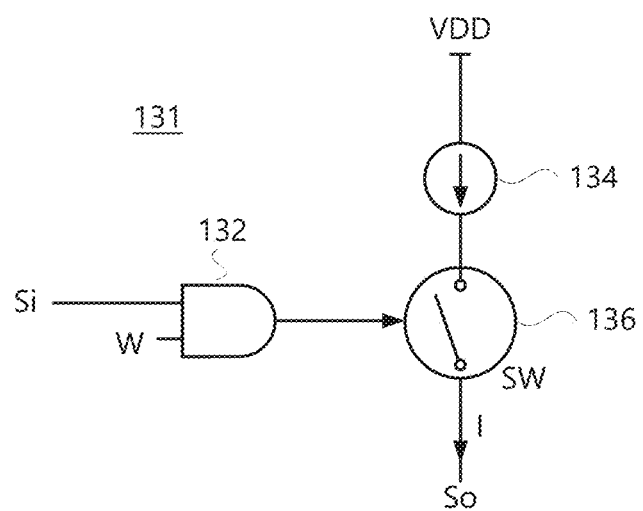
FIG. 2 is a diagram illustrating a circuit model of synapse circuits illustrated in FIG. 1 by way of example.

FIG. 2 is a diagram illustrating an exemplary circuit model of synapse circuits illustrated in FIG. 1. Referring to FIG. 2, the synapse circuit 131 may include an AND gate 132, a current source 134, and switches (SW) 136. The AND gate 132 of the synapse circuit 131 may receive an input spike signal Si generated from the neuron circuit of the first neuron array 110. The input spike signal Si may be a multiplicand which is a number multiplied in a multiplication operation. Meanwhile, the weight W may also be input to the AND gate 132 of the synapse circuit 131. For example, the weight W may be a multiplier, which is a number multiplied by a multiplication operation. The weight W may be input from the outside, stored inside the synapse circuit 131, or stored in a storage element included in the synapse array 130.

The synapse circuit 131 may perform a plurality of multiplication operations. The synapse circuit 131 may perform a multiplication operation on a multiplicand (Si) and a multiplier (W). Here, the result of the multiplication operation may be expressed as a current T.

The switch 136 may be switched on or switched off according to the result of the operation performed by the AND gate 132. For example, if the operation result performed by the AND gate is logic '1', the switch 136 will be switched-on, and if the operation result performed by the AND gate is logic '0', the switch 136 is will be switched off. As the switch 136 is switched-on, the current generated by the current source (CS) 134 will flow to the column line of the synapse circuit 131.

The current source 134 may be configured to linearly increase a voltage level due to electric charges charged in a capacitance (not shown) of the column line. In general, when a storage element such as a capacitor is charged, the voltage level across the capacitor increases non-linearly. Therefore, if the linearity of the column line is not guaranteed, it is difficult to calculate the sum of outputs of the plurality of synapse circuits.

The synapse circuit 131 of the above-described model may include, for example, a variable resistance device. A variable resistance device is a device that can switch between different resistance states according to a voltage or current applied to both ends. The variable resistance device may have a single layer structure or a multilayer structure including various materials capable of having a plurality of resistance states. Examples of various materials may include metal oxides such as transition metal oxides and perovskite materials, phase change materials such as chalcogenide materials, ferroelectric materials, and ferromagnetic materials and the like. An operation in which the variable resistance device and/or the synapse circuit 131 changes from a high resistance state to a low resistance state is referred to as a set operation, and an operation that changes from a low resistance state to a high resistance state may be referred to as a reset operation.

However, unlike variable resistance devices used in memory devices such as flash memory, RRAM, PRAM, FRAM, MRAM, the synapse circuit 131 does not have an abrupt resistance change in the set operation and reset operation. the synapse circuit 131 may be implemented to have various characteristics distinguishing from the variable resistance device in the memory, such as showing an analog behavior in which the conductivity gradually changes according to the number of input electrical pulses. This is because the characteristics required for the variable resistance device in the memory and the characteristics required for the synapse circuit 131 in the core of the artificial neural network device are different from each other.

Figure 3:
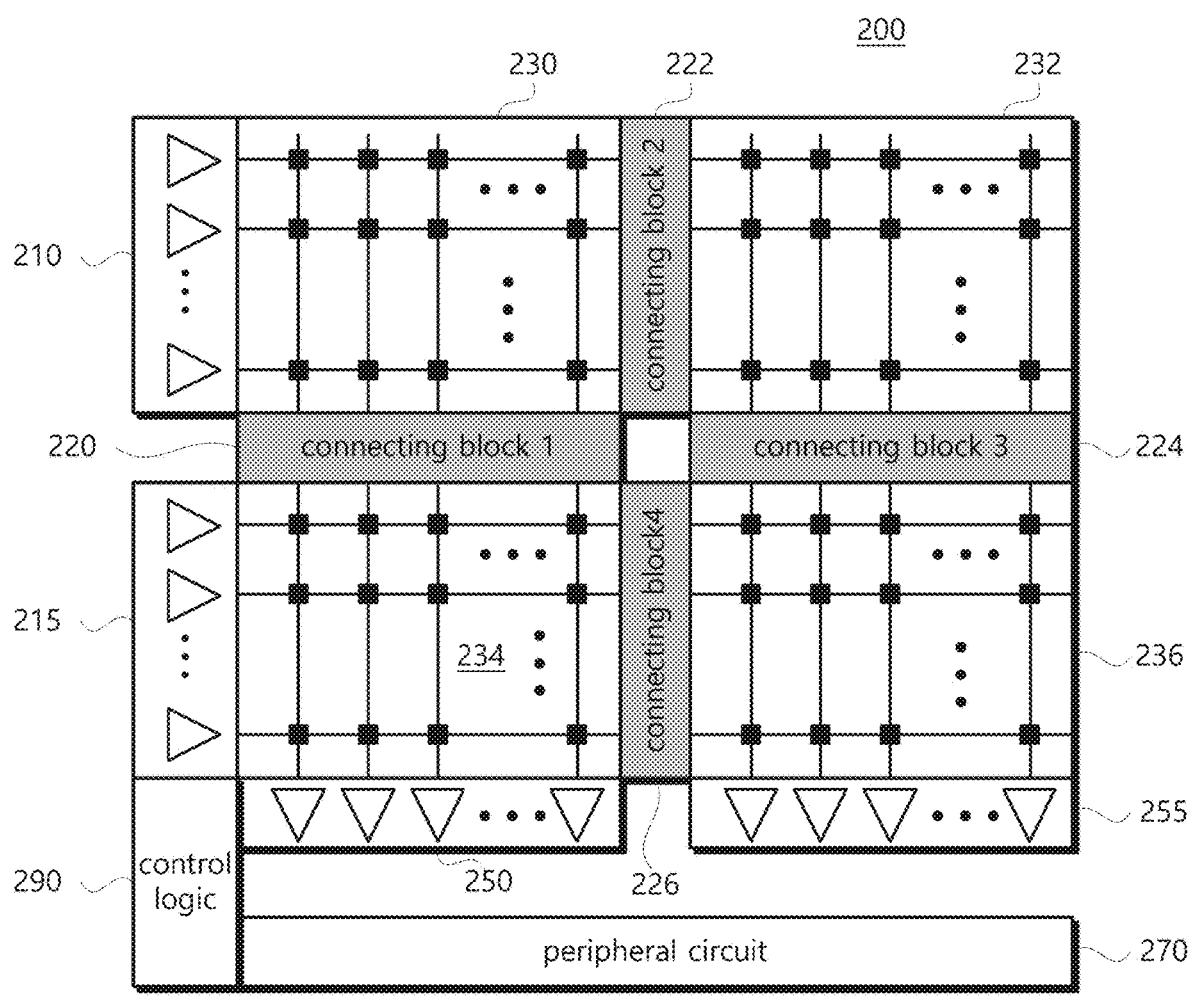
FIG. 3 is a diagram illustrating an expandable neuromorphic circuit according to an embodiment of the present invention.

FIG. 3 is a diagram illustrating an expandable neuromorphic circuit according to an embodiment of the present invention. Referring to FIG. 3, the neuromorphic circuit 200 may include first and second neuron arrays 210 and 215, first to fourth synapse arrays 230, 232, 234 and 236, and third and fourth neuron arrays 250 and 255, peripheral circuits 270, and control logic 290. In particular, the neuromorphic circuit 200 includes connecting blocks 220, 222, 224 and 226 connecting neighboring synapse arrays 230, 232, 234, 236.

The first and second neuron arrays 210 and 215 generate spike signals and transmit them to the synapse arrays 230 and 234. The axons of the first and second neuron arrays 210 and 215 may generate a spike signal based on data or information input from the outside. The number of rows transmitting an input spike signal may be increased by the first neuron array 210 and the second neuron array 215. For example, when the first neuron array 210 and the second neuron array 215 each include four neuron circuits, the number of neurons for generating the spike signal may be expanded to eight by an arrangement of the first and second neuron arrays 210 and 215.

The third and fourth neuron arrays 250 and 255 may receive operation signals to which weights are applied to the spike signals from the third and fourth synapse arrays 234 and 236, respectively. Neurons included in the third and fourth neuron arrays 250 and 255 may compare a sum signal with a threshold signal (ie, a reference signal), and generate an output spike signal when the sum signal is greater than the threshold signal. Here, the sum signal is a signal in which operation signals of synapses of the third and fourth synapse arrays 234 and 236 are accumulated. The third and fourth neuron arrays 250 and 255 may provide output spike signals to the first and second neuron arrays 210 and 215 again, or may output them to the outside of the neuromorphic circuit 200. The number of columns for receiving the spike signal may be increased by the third neuron array 250 and the fourth neuron array 255. For example, when the third neuron array 250 and the fourth neuron array 255 each include four neuron circuits, it may be expanded to eight rows of neuron circuits.

The synapse arrays 230, 232, 234, and 236 may connect the first and second neuron arrays 210 and 215 and the third and fourth neuron arrays 250 and 255. The first neuron array 210 and the third neuron array 250 may be connected by the first and third synapse arrays 230 and 234. The first synapse array 230 and the third synapse array 234 are connected by the first connecting block 220. Accordingly, the first synapse array 230 and the third synapse array 250 may operate as one synapse array. The first neuron array 210 and the fourth neuron array 255 may be connected by three synapse arrays 230, 232, and 236. The three synapse arrays 230, 232, 236 are connected by a second connecting block 222 and a third connecting block 224.

In the same way, the second neuron array 215 and the third neuron array 250 may be connected by the third synapse array 234. In addition, the second neuron array 215 and the fourth neuron array 255 are connected through two synapse arrays 234 and 236. The fourth connecting block 226 connects the two synapse arrays 234 and 236.

The first to fourth connecting blocks 220, 222, 224, 226 may connect the synapse arrays 230, 232, 234, 236 in a first direction or a second direction. The first connecting block 220 connects the first synapse array 230 and the third synapse array 234 to operate as one synapse array. The second connecting block 222 connects the first synapse array 230 and the second synapse array 232. The third connecting block 224 may connect the second synapse array 232 and the fourth synapse array 236. The fourth connecting block 226 connects the third synapse array 234 and the fourth synapse array 236 to operate as one synapse array.

For ideal connection between synapse arrays, the first to fourth connecting blocks 220, 222, 224, and 226 may include complementary pass transistor logic (hereinafter, CPTL). Complementary pass transistor logic (CPTL) may connect synapse arrays without loss, attenuation, or distortion of signals. However, it will be well understood that the configuration of the connecting block for connecting the synapse arrays in a hard wire manner is not limited to the complementary pass transistor logic (CPTL).

It is assumed that each synapse array has the same 4×4 size in the above manner. When the first to fourth connecting blocks 220, 222, 224, and 226 are used, a synaptic array having a size of 16×16 may be configured. Four synaptic arrays 230, 232, 234, 236 of 4×4 size may be used as a single 16×16 synaptic array by the first to fourth connecting blocks 220, 222, 224, 226. In addition, the shape and size of the synapse array, such as 4×8 and 4×16, may be expanded in various shapes according to the connection of the connecting blocks. In addition, synapse arrays may be expanded in 3D instead of 2D.

Figure 4:
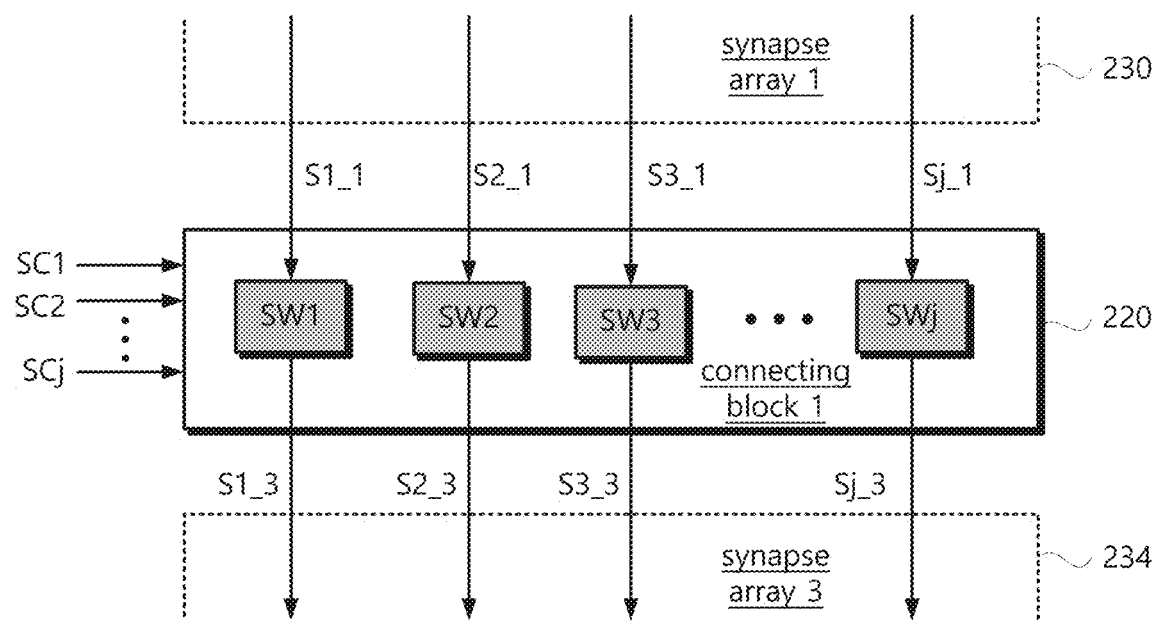
FIG. 4 is a block diagram illustrating an exemplary configuration of the first connecting block of FIG. 3.

FIG. 4 is a block diagram illustrating an exemplary configuration of the first connecting block of FIG. 3. Referring to FIG. 4, the first connecting block 220 may connect column lines S1_1 to Sj_1 of the first synapse array 230 and column lines S1_3 to Sj_3 of the third synapse array 234 in a hardwire method. Here, j is a natural number. The first connecting block 220 may include a plurality of switches SW1 to SWj controlled by the switching control signals SC1 to SCj. The switching control signals SC1 to SCj may be provided, for example, from the control logic 290.

The first switch SW1 may connect or cut off the column line S1_1 of the first synapse array 230 and the column line S_3 of the third synapse array 234 by the first switching control signal SC1. If the signal flows from the column line S1_1 to the column line S1_3, the first switch SW1 may transmit the same signal level as the signal level of the column line S1_1 to the column line S1_3 without a problem due to the threshold voltage.

All of the switches SW2 to SWj including the second switch SW2 may connect or cut off the column lines S2_1 to Sj_1 of the first synapse array 230 and the column lines S2_3 to Sj_3 of the third synapse array 234 by switching control signals SC2 to SCj. As briefly described above, each of the switches SW1 to SWj may preferably be implemented with a complementary pass transistor logic CPTL.

Figure 5:
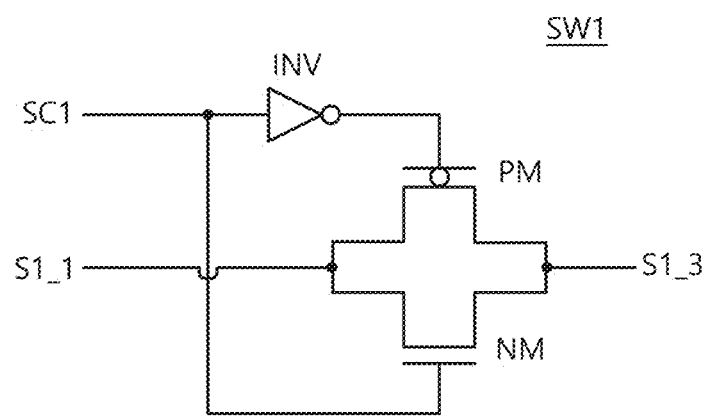
FIG. 5 is a circuit diagram showing an exemplary configuration of the first switch of FIG. 4.

FIG. 5 is a circuit diagram showing an exemplary configuration of the first switch of FIG. 4. Referring to FIG. 5, the first switch SW1 may be configured with a complementary pass transistor logic CPTL.

The first switch SW1 composed of the complementary pass transistor logic CPTL includes an inverter INV, a PMOS transistor PM, and an NMOS transistor NM. The PMOS transistor PM and the NMOS transistor NM are simultaneously turned on or off by the first switching control signal SC1. The first switch SW1 can transmit the signal level of the column line S_1 to the column line S1_3 due to the threshold voltage complementary relationship between the PMOS transistor PM and the NMOS transistor NM without a level change.

Figure 6:
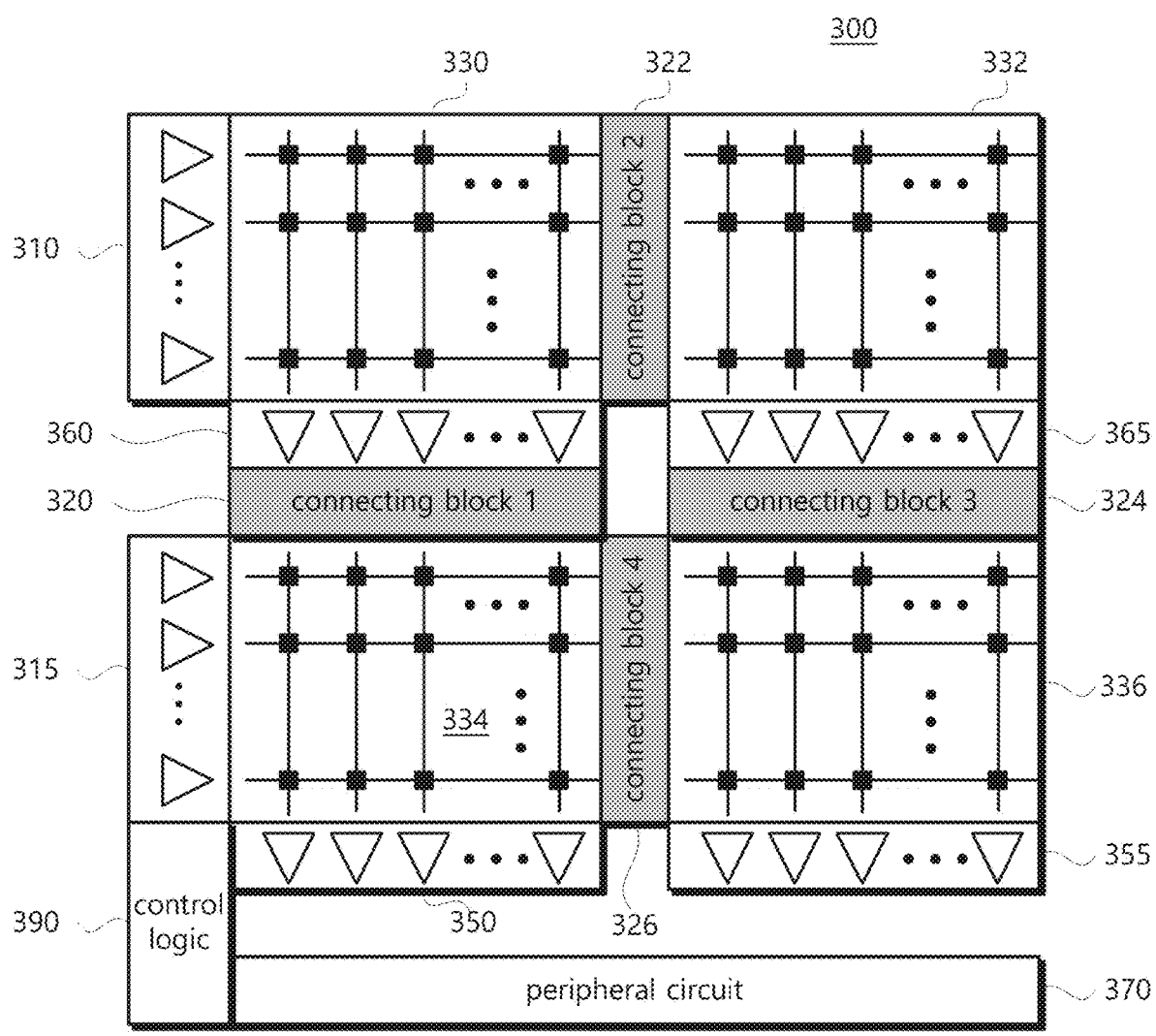
FIG. 6 is a diagram illustrating a neuromorphic circuit according to another embodiment of the present invention.

FIG. 6 is a diagram illustrating a neuromorphic circuit according to another embodiment of the present invention. Referring to FIG. 6, the neuromorphic circuit 300 includes neuron arrays 310, 315, 350, 355, 360, 365, first to fourth synapse arrays 330, 332, 334, 336, and a peripheral circuit 370, and control logic 390. In particular, the neuromorphic circuit 300 includes second and fourth connecting blocks 322 and 326 connecting synapse arrays, and first and third connecting blocks 320 and 324 connecting neuron arrays and synapse arrays.

The first and second neuron arrays 310 and 315 generate spike signals and transmit them to the synapse arrays 330 and 334. The axons of the first and second neuron arrays 310 and 315 may generate a spike signal based on data or information input from the outside. The number of rows transmitting a spike signal may be increased by the first neuron array 310 and the second neuron array 315. For example, when the first neuron array 310 and the second neuron array 315 each include four neuron circuits, by the arrangement of the first and second neuron arrays 310 and 315, the number of neurons for generating the spike signal may be expanded to eight.

The third and fourth neuron arrays 350 and 355 may receive operation signals to which weights are applied to the spike signals from the third and fourth synapse arrays 334 and 336, respectively. Neurons included in the third and fourth neuron arrays 350 and 355 may compare a sum signal with a threshold signal (ie, a reference signal), and generate an output spike signal when the sum signal is greater than the threshold signal. Here, the sum signal is a signal in which operation signals of synapses of the third and fourth synapse arrays 234 and 236 are accumulated. The number of rows for receiving the spike signal may be increased by the third neuron array 350 and the fourth neuron array 355. For example, when the third neuron array 350 and the fourth neuron array 355 each include four neuron circuits, they may be expanded to eight columns of neuron circuits.

The fifth and sixth neuron arrays 360 and 365 may receive operation signals to which weights are applied to the spike signals from the first and second synapse arrays 330 and 332, respectively. Neurons included in the fifth and sixth neuron arrays 360 and 365 may compare a sum signal with a threshold signal (ie, a reference signal), and generate an output spike signal when the sum signal is greater than the threshold signal. Here, the sum signal is a signal in which operation signals of synapses of the first and second synapse arrays 330 and 332 are accumulated. The fifth neuron array 360 is connected to the third synapse array 334 by the first connecting block 320. The sixth neuron array 365 is connected to the fourth synapse array 336 by a third connecting block 324.

The synapse arrays 330, 332, 334, and 336 are positioned between the first and second neuron arrays 310 and 315 and the third and fourth neuron arrays 350 and 355. The first synapse array 330 and the second synapse array 332 are connected by a second connecting block 322. The third synapse array 334 and the fourth synapse array 336 are connected by a fourth connecting block 326.

The first connecting block 320 connects the fifth neuron array 360 and the third synapse array 334. The third connecting block 324 connects the sixth neuron array 365 and the fourth synapse array 336. In addition, the second connecting block 322 connects the first synapse array 330 and the second synapse array 332. The fourth connecting block 326 connects the third synapse array 334 and the fourth synapse array 336.

For an ideal connection between a neuron array and a synapse array or between synapse arrays, the first to fourth connecting blocks 320, 322, 324, and 326 may include complementary pass transistor logic (CPTL). However, it will be well understood that the configuration of the connecting block for connecting the synapse arrays in a hard wire manner is not limited to the complementary pass transistor logic (CPTL).

It is assumed that each of the synapse arrays 330, 332, 334, 336 has 4×4 size. When the first to fourth connecting blocks 320, 322, 324, and 326 are used, a synaptic array having a size of 16×16 may be configured. Four synapse arrays 330, 332, 334, and 336 of 4×4 size may be used as a synapse array of 16×16 size by the first to fourth connecting blocks 320, 322, 324, and 326. In particular, the neuromorphic circuit 300 may include a hidden layer by the addition of the fifth and sixth neuron arrays 360 and 365. In addition, an operation effect such as pruning or dropout may be provided through the switching control signal SC of the first to fourth connecting blocks 320, 322, 324 and 326. In addition, the shape and size of the synapse array, such as 4×8 and 4×16, can be expanded in various shapes according to the connection of the connecting blocks.

The peripheral circuit 370 may control all analog operations of the neuromorphic circuit 300. The peripheral circuit 370 may provide or control an operating condition or a bias condition of the neuron arrays 310, 315, 350, 355, 360, 365 and the synapse arrays 330, 332, 334, 336.

The control logic 390 may control an operation sequence of the neuromorphic circuit 300 in response to an external control request. The control logic 390 may control the transmission, processing, and update of spike signals of the neuron arrays 310, 315, 350, 355, 360, 365 and the synapse arrays 330, 332, 334, 336. In particular, the control logic 390 may provide the switching control signal SC to the first to fourth connecting blocks 320, 322, 324 and 326. The neuromorphic circuit 300 implemented in hardware through the switching control signal SC may provide an operation effect such as pruning or dropout.

Figure 7:
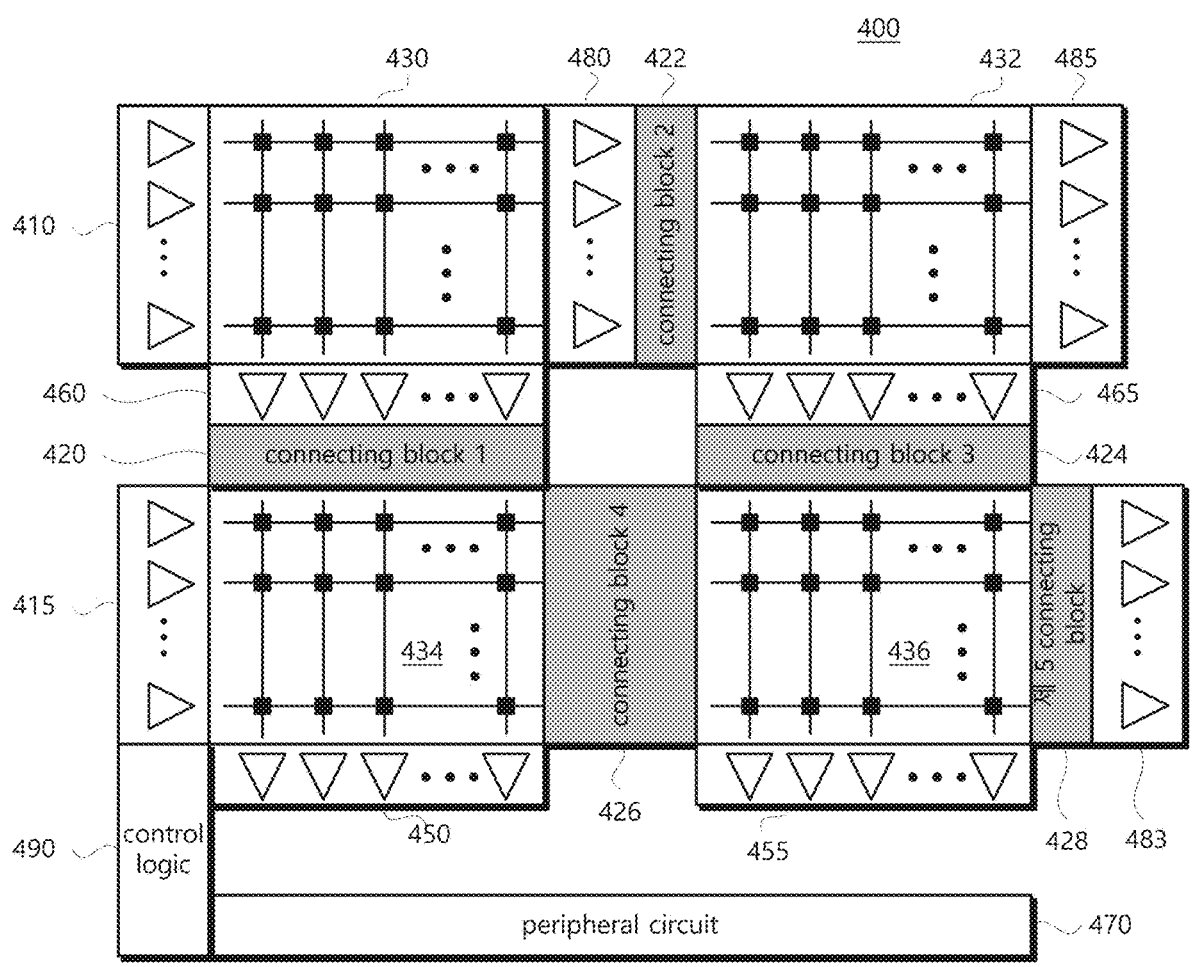
FIG. 7 is a diagram illustrating a neuromorphic circuit according to another embodiment of the present invention.

FIG. 7 is a diagram illustrating a neuromorphic circuit according to another embodiment of the present invention. Referring to FIG. 7, the neuromorphic circuit 400 includes neuron arrays 410, 415, 450, 455, 460, 465, 480, 483, 485, and first to fourth synapse arrays 430, 432, 434, 436, a peripheral circuit 470, and a control logic 490. The fifth and sixth neuron arrays 460 and 465 are connected to column lines arranged in the second direction of the synapse arrays 430 and 432. However, the seventh to ninth neuron arrays 480, 483, and 485 may be used to expand the core in the first direction.

The first and second neuron arrays 410 and 415 generate spike signals and transmit them to the synapse arrays 430 and 434. The axons of the first and second neuron arrays 410 and 415 may generate a spike signal based on data or information input from the outside. The number of rows transmitting the spike signal may be increased by the first neuron array 410 and the second neuron array 415.

The third and fourth neuron arrays 450 and 455 may receive operation signals to which weights are applied to the spike signals from the third and fourth synapse arrays 434 and 436, respectively. Neurons included in the third and fourth neuron arrays 450 and 455 are compared with the sum signal in which the operation signals of the synapses of the third and fourth synapse arrays 434 and 436 are accumulated and a threshold signal (ie, a reference signal), and if the sum signal is greater than the threshold signal, it can generate an output spike signal. The number of columns receiving the spike signal may be increased by the third neuron array 450 and the fourth neuron array 455.

The fifth and sixth neuron arrays 460 and 465 may receive operation signals to which weights are applied to the spike signals from the first and second synapse arrays 430 and 432, respectively. The neuron circuits included in the fifth and sixth neuron arrays 460 and 465 compare the sum signal accumulated with the operation signals of the synapses of the first and second synapse arrays 430 and 432 with the threshold signal, and the sum signal is critical. If it is greater than the signal, it can generate an output spike signal. The fifth neuron array 460 is connected to the third synapse array 434 by the first connecting block 420. The sixth neuron array 465 is connected to the fourth synapse array 436 by a third connecting block 424. The seventh neuron array 480 may form one stage between the first synapse array 430 and the second synapse array 432. The output spike signal of the seventh neuron array 480 may be transmitted to the second synapse array 432 by the second connecting block 422.

The eighth neuron array 485 is connected to the row line of the second synapse array 432. In addition, the ninth neuron array 483 may be connected to the row line of the fourth synapse array 436 by the fifth connecting block 428.

The first to fifth connecting blocks 420, 422, 424, 426, and 428 may connect the neuron array and the synapse array, or may connect the synapse arrays. For an ideal connection between a neuron array and a synapse array or between synapse arrays, the first to fifth connecting blocks 420, 422, 424, 426, and 428 may include complementary pass transistor logic (CPTL). However, it will be well understood that the configuration of the connecting block for connecting the synapse arrays in a hard wire manner is not limited to the complementary pass transistor logic (CPTL).

Each of the synapse arrays may be expanded in a first direction or a second direction by the first to fifth connecting blocks 420, 422, 424, 426, and 428. By using the connecting block of the present invention, synapse arrays of limited size can be expanded to a core of a required size. In addition, through the control of the switch control signal SC of the first to fifth connecting blocks (420, 422, 424, 426, 428), the neuromorphic circuit 400 may provide operation effects such as a pruning or a dropout in hardware.

The peripheral circuit 470 may control all analog operations of the neuromorphic circuit 400. The peripheral circuit 470 may provide or control the operating condition or bias condition of the neuron arrays 410, 415, 450, 455, 460, 465, 480, 483, 485, and the first to fourth synapse arrays 430, 432, 434, 436.

The control logic 490 may control an operation sequence of the neuromorphic circuit 400 in response to an external control request. The control logic 490 may control transmission, processing, or update of spike signals of neuron arrays 410, 415, 450, 455, 460, 465, 480, 483, 485, and the first to fourth synapse arrays 430, 432, 434, 436. In particular, the control logic 490 may provide the switching control signal SC to the first to fifth connecting blocks 420, 422, 424, 426 and 428. The neuromorphic circuit 400 implemented in hardware may perform a pruning or dropout operation through the switching control signal SC.

According to the embodiment of the present invention described above, the neuromorphic circuit can easily expand the size of the synapse element array to a desired size by using the connecting block.

The above-described contents are specific examples for carrying out the present invention. Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. A neuromorphic circuit comprising:
a first neuron array including a plurality of neuron circuits generating a spike signal;
a first synapse array including a plurality of first synapse circuits to process and output the spike signal transmitted from the first neuron array;
a second synapse array including a plurality of second synapse circuits;
a first connecting block positioned between the first synapse array and the second synapse array and connecting the first synapse array and the second synapse array in response to a control signal; and
a control logic to generate the control signal;
wherein the first connecting block connects column lines in the first synapse array respectively to an equal number of column lines in the second synapse array,
wherein the first connecting block includes a plurality of switches for transmitting signals of input lines or output lines of the first synapse circuits in response to the control signal, each of the plurality of switches connecting a column line in the first synapse array to a column line in the second synapse array, and
wherein each of the plurality of switches includes complementary pass transistor logic (CPTL) that transmits a same signal level as a signal level in the column line in the first synapse array to the column line in the second synapse array.

2. The neuromorphic circuit of claim 1, further comprising:
a second neuron array positioned between the first synapse array and the first connecting block; and
a third neuron array connected to the output lines of the second synapse array and generating an output spike signal.

3. The neuromorphic circuit of claim 1, further comprising:
a third synapse array formed in a second direction perpendicular to the first synapse array; and
a second connecting block connecting the first synapse array and the third synapse array,
wherein the second synapse array is formed in a first direction with respect to the first synapse array.

4. The neuromorphic circuit of claim 3, further comprising:
a second neuron array formed between the first synapse array and the second connecting block.

5. A neuromorphic circuit comprising:
a first neuron array arranged in a column direction and including a plurality of first neuron circuits generating first spike signals;
a first synapse array including a plurality of first synapse circuits processing and outputting the first spike signals transmitted from the first neuron array;
a second synapse array positioned in a row direction of the first synapse array and including a plurality of second synapse circuits receiving the first spike signals;
a second neuron array arranged in the column direction and including a plurality of second neuron circuits generating second spike signals;
a third synapse array including a plurality of third synapse circuits processing and outputting the second spike signals transmitted from the second neuron array;
a fourth synapse array positioned in the row direction of the third synapse array and including a plurality of fourth synapse circuits receiving the second spike signals;
a first connecting block positioned between the first synapse array and the third synapse array and connecting the first synapse array and the third synapse array in response to a control signal;
a second connecting block positioned between the first synapse array and the second synapse array and connecting the first synapse array and the second synapse array in response to the control signal;
a third connecting block positioned between the second synapse array and the fourth synapse array and connecting the second synapse array and the fourth synapse array in response to the control signal;
a fourth connecting block positioned between the third synapse array and the fourth synapse array and connecting the third synapse array and the fourth synapse array in response to the control signal; and
a control logic to generate the control signal;
wherein the first connecting block connects column lines in the first synapse array respectively to an equal number of column lines in the third synapse array,
wherein each of the first to fourth connecting blocks includes complementary pass transistor logic configured to transmit a same signal level as a signal level in a column line in a transmitting synapse array to a column line in a receiving synapse array,
wherein the first connecting block and the third connecting block extend in the row direction and the second connecting block and the fourth connecting block extend in the column direction,
wherein the first connecting block extends across all of the column lines in the first synapse array and all of the column lines in the third synapse array, and the third connecting block extends across all of the column lines in the second synapse array and all of the column lines in the fourth synapse array, and
wherein in a plan view the first connecting block, the second connecting block, the third connecting block and the fourth connecting block form a cruciform shape.

6. The neuromorphic circuit of claim 5, further comprising:
a third neuron array connected to output lines of the third synapse array and generating a first output spike signal; and
a fourth neuron array connected to the output lines of the fourth synapse array and generating a second output spike signal.

7. The neuromorphic circuit of claim 5, wherein the first connecting block comprises a plurality of first switches each including a CPTL device for transmitting output signals of the first synapse circuits to the third synapse circuit without level change in response to the control signal.

8. The neuromorphic circuit of claim 7, wherein the second connecting block comprises a plurality of second switches each including a CPTL device for transmitting the first spike signals transmitted from the first neuron array to the second synapse circuit without changing a level in response to the control signal.

9. The neuromorphic circuit of claim 8, wherein the third connecting block comprises a plurality of third switches each including a CPTL device for transmitting output signals of the second synapse circuits to the fourth synapse circuit without changing a signal level in response to the control signal.

10. The neuromorphic circuit of claim 9, wherein the fourth connecting block comprises a plurality of fourth switches each including a CPTL device for transmitting the second spike signals transmitted from the second neuron array to the fourth synapse circuit without changing a level in response to the control signal.

11. The neuromorphic circuit of claim 5, further comprising:
a third neuron array positioned between the first synapse array and the first connecting block; and
a fourth neuron array positioned between the second synapse array and the third connecting block.

12. The neuromorphic circuit of claim 11, further comprising:
a fifth neuron array connected to output lines of the third synapse array and generating first output spike signals; and
a sixth neuron array connected to the output lines of the fourth synapse array and generating second output spike signals.

13. A neuromorphic circuit comprising:
a first synapse array including a plurality of first synapse circuits for processing and outputting input spike signals;
a second synapse array including a plurality of second synapse circuits; and
a connecting block positioned between the first synapse array and the second synapse array and connecting the first synapse array and the second synapse array in response to a control signal;
wherein the connecting block connects column lines in the first synapse array respectively to an equal number of column lines in the second synapse array, and
wherein the connecting block comprises a plurality of switches each including a CPTL device for transmitting signals of output lines of the first synapse array to the second synapse array without changing a level in response to the control signal.

14. The neuromorphic circuit of claim 13, wherein the control signal is provided based on a pruning or dropout operation.

* * * * *